United States Patent
Rausch et al.

(10) Patent No.: US 10,706,876 B1
(45) Date of Patent: Jul. 7, 2020

(54) WIRE ASSISTED MAGNETIC RECORDING WITH AN ALTERNATING CURRENT DRIVING THE WIRE

(71) Applicant: Seagate Technology LLC, Cupertino, CA (US)

(72) Inventors: Tim Rausch, Farmington, MN (US); Edward Charles Gage, Lakeville, MN (US); Zengyuan Liu, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/440,306

(22) Filed: Jun. 13, 2019

(51) Int. Cl.
*G11B 5/127* (2006.01)
*G11B 5/31* (2006.01)
*G11B 11/105* (2006.01)
*G11B 5/00* (2006.01)

(52) U.S. Cl.
CPC ............ *G11B 5/1278* (2013.01); *G11B 5/315* (2013.01); *G11B 11/10534* (2013.01); *G11B 2005/001* (2013.01); *G11B 2005/0029* (2013.01)

(58) Field of Classification Search
CPC .. G11B 5/1278; G11B 5/315; G11B 11/10534
USPC ........................................ 360/125.3–125.35
See application file for complete search history.

(56) References Cited

U.S. PATENT DOCUMENTS

| | | | |
|---|---|---|---|
| 7,149,055 B2 | 12/2006 | Clinton et al. | |
| 7,212,367 B2 | 5/2007 | Clinton et al. | |
| 7,818,760 B2 | 10/2010 | Seigler et al. | |
| 7,869,309 B2 | 1/2011 | Mihalcea et al. | |
| 8,035,923 B2 * | 10/2011 | Suzuki .............. | G11B 33/1466 360/245.8 |
| 8,077,417 B2 | 12/2011 | Mallary et al. | |
| 8,286,333 B2 | 10/2012 | Amin et al. | |
| 8,339,736 B2 | 12/2012 | Gao et al. | |
| 8,411,390 B2 | 4/2013 | Franca-Neto et al. | |
| 8,587,900 B2 | 11/2013 | Franca-Neto et al. | |
| 8,634,163 B2 | 1/2014 | Tanabe et al. | |
| 8,638,527 B2 | 1/2014 | Franca-Neto et al. | |
| 8,908,330 B1 * | 12/2014 | Mallary .............. | G11B 5/6005 360/125.3 |
| 9,159,339 B2 | 10/2015 | Scholz et al. | |
| 9,355,654 B1 * | 5/2016 | Mallary .............. | G11B 5/1278 |
| 9,490,620 B1 * | 11/2016 | Albrecht ............... | G11B 33/14 |
| 9,508,371 B2 | 11/2016 | Stoebe et al. | |
| 10,424,345 B1 * | 9/2019 | Namihisa ............ | G11B 25/043 |
| 2008/0112087 A1 | 5/2008 | Clinton et al. | |
| 2009/0002883 A1 | 1/2009 | Ionescu et al. | |
| 2009/0002895 A1 * | 1/2009 | Pust ........................ | G11B 5/02 360/319 |
| 2009/0237837 A1 | 9/2009 | Amin et al. | |
| 2009/0262636 A1 | 10/2009 | Xue et al. | |

(Continued)

*Primary Examiner* — Allen T Cao
(74) *Attorney, Agent, or Firm* — Westman, Champlin & Koehler, P.A.

(57) ABSTRACT

A recording head for writing data on tracks of a data storage medium. The recording head includes a writer having a write pole and a trailing shield. The write pole includes a pole tip configured to write on the tracks of the data storage medium. The recording head also includes a writing-assistance wire that is positioned between the pole tip and the trailing shield in a down-track direction.

20 Claims, 8 Drawing Sheets

(56) References Cited

U.S. PATENT DOCUMENTS

2011/0007428 A1* 1/2011 Batra .................... G11B 5/3116
 360/319
2013/0003225 A1 1/2013 Amin et al.
2013/0057983 A1* 3/2013 Tanabe .................. G11B 5/012
 360/234.3

* cited by examiner

DC CURRENT IN WIRE

AC CURRENT IN WIRE

WIRE ASSISTED MAGNETIC RECORDING WITH AN ALTERNATING CURRENT DRIVING THE WIRE

SUMMARY

In one embodiment, a recording head for writing data on tracks of a data storage medium is provided. The recording head includes a writer having a write pole and a trailing shield. The write pole includes a pole tip configured to write on the tracks of the data storage medium. The recording head also includes a writing-assistance wire that is positioned between the pole tip and the trailing shield in a down-track direction.

In another embodiment, a method of making a recording head for writing data on tracks of a data storage medium is provided. The method includes providing a writer having a write pole and a trailing shield, with the write pole comprising a pole tip configured to write on the tracks of the data storage medium. The method also includes providing a writing-assistance wire between the pole tip and the trailing shield in a down-track direction.

In yet another embodiment, a data storage device is provided. The data storage device includes a data storage medium having tracks. The data storage device also includes a recording head including a writer having a write pole and a trailing shield. The write pole includes a pole tip configured to write on the tracks of the data storage medium. The recording head further includes a writing-assistance wire positioned between the pole tip and the trailing shield in a down-track direction.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure relate to wire assisted magnetic recording with an alternating current driving the wire, which improves tracks per inch (TPI) and hence drive capacity. However, prior to providing details regarding the different embodiments, a description of an illustrative operating environment is provided below.

Figure 1A:
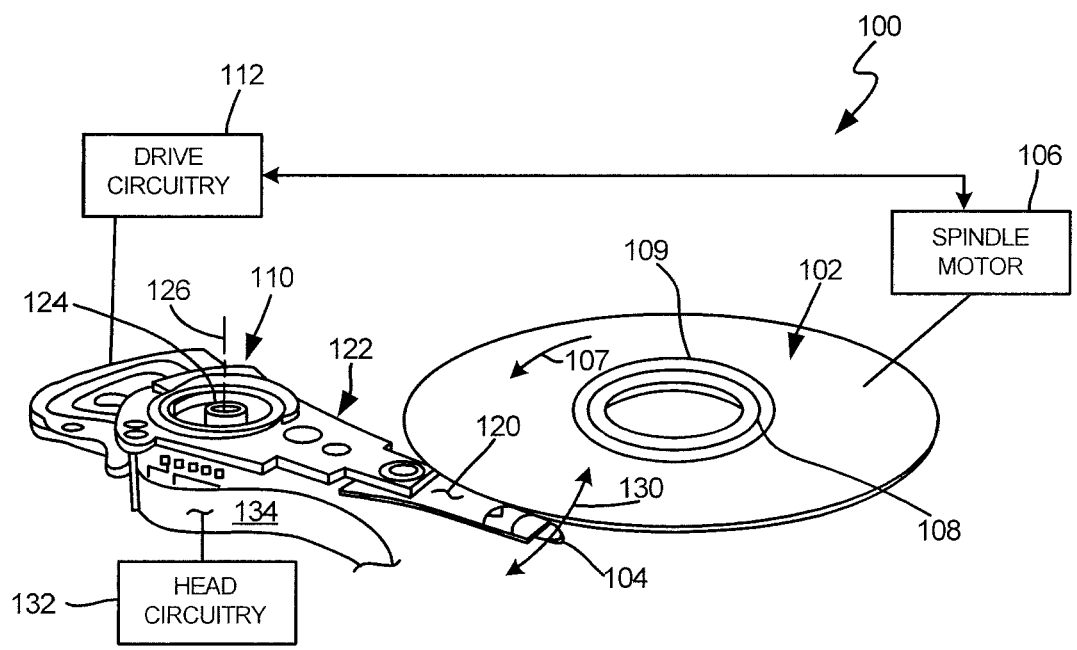
FIG. 1A illustrates an embodiment of a data storage device in which embodiments of the present application can be used.

FIG. 1A shows an illustrative operating environment in which certain recording head embodiments as disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a schematic illustration of a data storage device 100 including a data storage medium and a recording head for reading data from and/or writing data to the data storage medium. As shown in FIG. 1A, the data storage device 100 includes a data storage medium or disc 102 and a recording head 104. The head 104 including one or more transducer elements (not shown in FIG. 1A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks (e.g., 108 and 109) on the rotating medium 102. In some embodiments, tracks 108 and 109 may be written in a conventional non-overlapping format. In other embodiments, the tracks may be written in a partially-overlapping shingled pattern.

An example of shingled magnetic recording is provided further below win connection with FIG. 3.

In the embodiment of FIG. 1A, both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 1B:
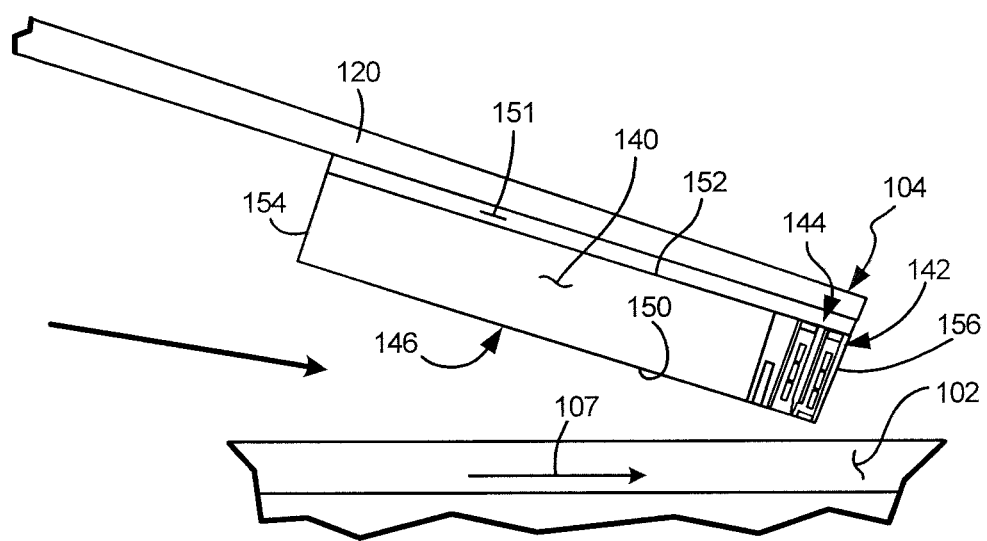
FIG. 1B is a schematic illustration of a head including one or more transducer elements above a magnetic recording medium.

FIG. 1B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly or writer 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140. A transducer/recording head portion including a writer in accordance with different embodiments is described below in connection with FIGS. 2A-2F.

Figure 2A:
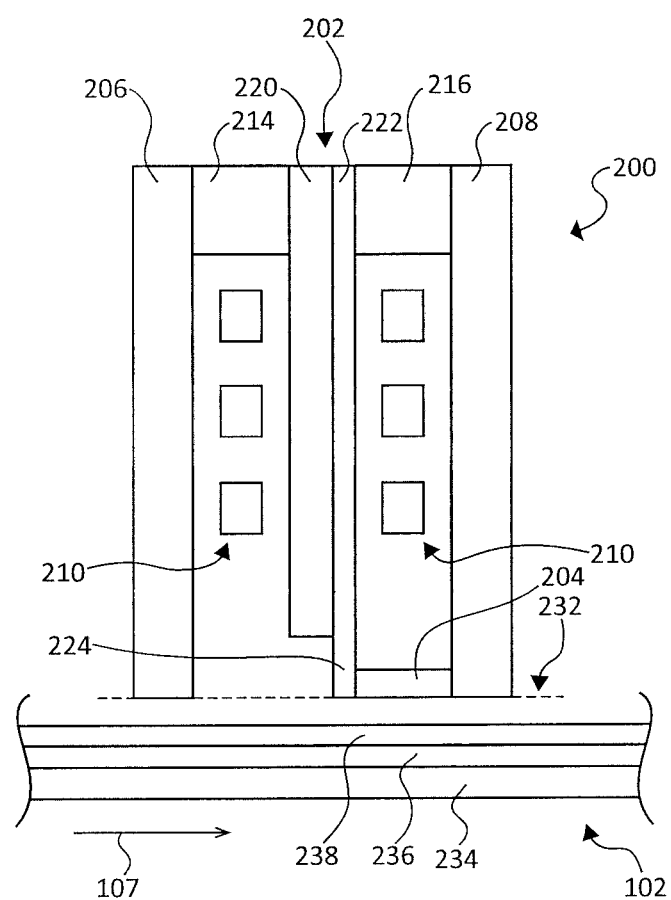
FIG. 2A is a cross-sectional view of a writer including a writing-assistance wire positioned in a down-track direction in accordance with a first embodiment.

FIG. 2A is a cross-sectional view of a writer 200 including a writing-assistance wire positioned in a down-track direction in accordance with one embodiment. Writer 200 includes a write pole 202, a writing-assistance wire 204, a first return pole or leading shield 206, a second return pole or trailing shield 208, and a conductive coil 210. Write pole 202 is magnetically coupled to first return pole 206 by a first magnetic piece 214, and to second return pole 208 by second magnetic piece 216. Conductive coil 210 surrounds write pole 202 such that portions of conductive coil 210 are disposed between write pole 202 and first return pole or leading shield 206, and between write pole 202 and second return pole or trailing shield 208. Write pole 202 includes yoke 220 and write pole body 222 having write pole tip 224.

First return pole or leading shield 206, second return pole or trailing shield 208, first magnetic piece 214, and second magnetic piece 216 may comprise soft magnetic materials, such as NiFe. Conductive coil 210 may comprise a material with low electrical resistance, such as Cu. Write pole body 222 may comprise a high moment soft magnetic material, such as CoFe, and yoke 224 may comprise a soft magnetic material, such as NiFe, to improve the efficiency of flux delivery to write pole body 222.

Writer 200 confronts magnetic medium 102 at medium confronting surface or bearing surface 232 defined by write pole tip 224, first return pole or leading shield 206, and second return pole or trailing shield 208. Magnetic medium 102 includes substrate 234, soft underlayer (SUL) 236, and medium layer 238. SUL 236 is disposed between substrate 234 and medium layer 238. Magnetic medium 102 is positioned proximate to writer 200 such that the surface of medium layer 238 opposite SUL 236 faces write pole 202. Magnetic medium 102 is shown merely for purposes of illustration, and, as indicated above, may be any type of medium usable in conjunction with writer 200, such as composite media (e.g., exchange coupled composite (ECC) media), continuous/granular coupled (CGC) media, ECC+ECG media, discrete track media, and bit-patterned media.

Writer 200 is carried over the surface of magnetic medium 102, which is moved relative to writer 200 as indicated by arrow 107 such that write pole 202 trails first return pole or leading shield 206, leads second return pole 208, and is used to physically write data to magnetic medium 102. In order to write data to magnetic medium 102, a current is caused to flow through conductive coil 210. The magnetomotive force in conductive coil 210 causes magnetic flux to travel from write pole tip 224 perpendicularly through medium layer 238, across SUL 236, and through first return pole or leading shield 206 and first magnetic piece 214 to provide a first closed magnetic flux path. The direction of the write field at the medium confronting surface of write pole tip 224, which is related to the state of the data written to magnetic medium 102, is controllable based on the direction that the first current flows through first conductive coil 210.

Stray magnetic fields from outside sources, such as a voice coil motor associated with actuation of writer 200 relative to magnetic medium 102, may enter SUL 236. Due to the closed magnetic path between write pole 202 and first return pole or leading shield 206, these stray fields may be drawn into writer 200 by first return pole or leading shield 206. In order to reduce or eliminate these stray fields, second return pole or trailing shield 208 is connected to write pole 202 via second magnetic piece 216 to provide a flux path for the stray magnetic fields. The stray fields enter first return pole or leading shield 206, travels through first magnetic piece 214 and second magnetic piece 216, and exits magnetic writer 200 via second return pole or trailing shield 208.

Writer 200 is shown merely for purposes of illustrating an example construction that may be used in conjunction with the principles of the present disclosure, and variations on this design may be made. For example, while write pole 202 includes write pole body 222 and yoke 220, write pole 202 can also be comprised of a single layer of magnetic material. In addition, a single trailing return pole or trailing shield 208 may be provided instead of the shown dual return pole writer configuration. Furthermore, in some embodiments, the second return pole and the trailing shield may be different portions as shown in reader 207 of FIG. 2B. Here, portion 208 is the second return pole and portion 209 is the separate trailing shield that extends from the return pole 208.

Referring back to FIG. 2A, to write data to high coercivity medium layer 238, a stronger write field may be provided to impress magnetization reversal in the medium. To accomplish this, writing-assistance wire 204 is provided proximate to magnetic medium 102 in a down-track direction. In the embodiment of FIG. 2A, writing-assistance wire 204 is in contact with both pole tip 224 and second return pole or trailing shield 208. When a current is applied to writing-assistance wire 204, an assist magnetic field is generated that augments the write field produced by write pole 202. The combination of the write field and the assist field generated by wire 204 overcomes the high coercivity of medium layer 238 to permit controlled writing of data to magnetic medium 102.

Figure 2B:
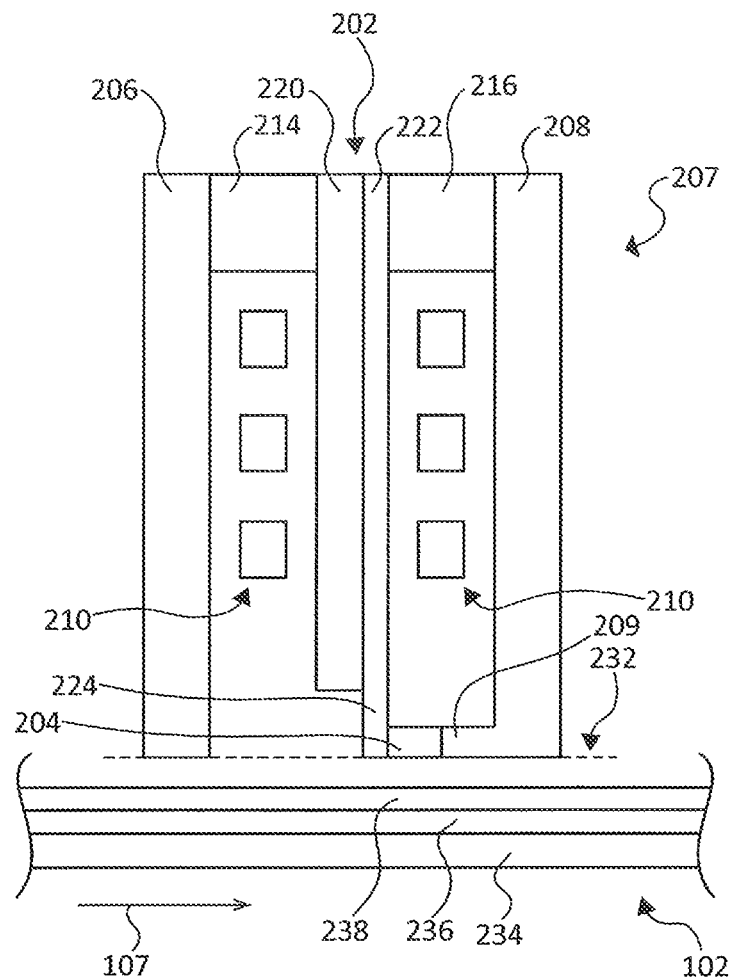
FIG. 2B is a cross-sectional view of a writer including a writing-assistance wire positioned in a down-track direction in accordance with a second embodiment.
Figure 2C:
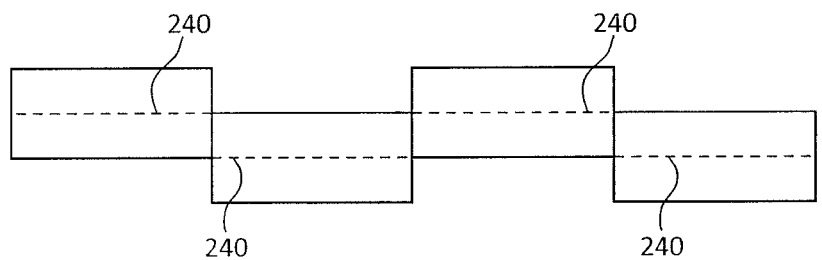
FIG. 2C is a diagrammatic illustration showing changes in a track center when direct current is supplied to the writing-assistance wire and a polarity of a write pole of the writer changes.

FIG. 2C is a diagrammatic illustration showing changes in a track center 240 when direct current is supplied to writing-assistance wire 204 and a polarity of write pole 202 of writer 200 changes. Because the direct current is only in one direction, the wire assist field generated does not change direction when the polarity of write pole 202 changes due to a change in direction of current through conductive coil 210. This causes the track center 240 to change with magnetization polarity and results in a relatively wide track as shown in FIG. 2C.

Figure 2D:
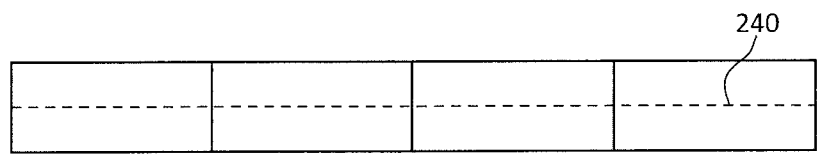
FIG. 2D is a diagrammatic illustration showing the track center unchanged when alternating current is supplied to the writing-assistance wire and a polarity of a write pole of the writer changes.

FIG. 2D is a diagrammatic illustration showing track center 240 unchanged when alternating current is supplied to writing-assistance wire 204 and a polarity of write pole 202 of writer 200 changes. Here, a direction of the current through writing-assistance wire 204 is changed when the polarity of write pole 202 changes due to the change in direction of current through conductive coil 210. In other words, changing the direction of the current through the writing-assistance wire 204 when the direction of the current of through the conductive coil 210 is changed ensures that the track center 240 does not change with the change in the polarity of the write pole 202. This results in a narrower track compared to the track shown in FIG. 2C, and therefore provides a tracks per inch (TPI) advantage and hence a gain in areal density capability (ADC). Another reason for narrower tracks is due to a field, which is produced when current is passed through a writing-assistance wire 204, cancelling a portion of a field from the write pole 202. This is described further in connection with FIG. 2E.

Figure 2E:
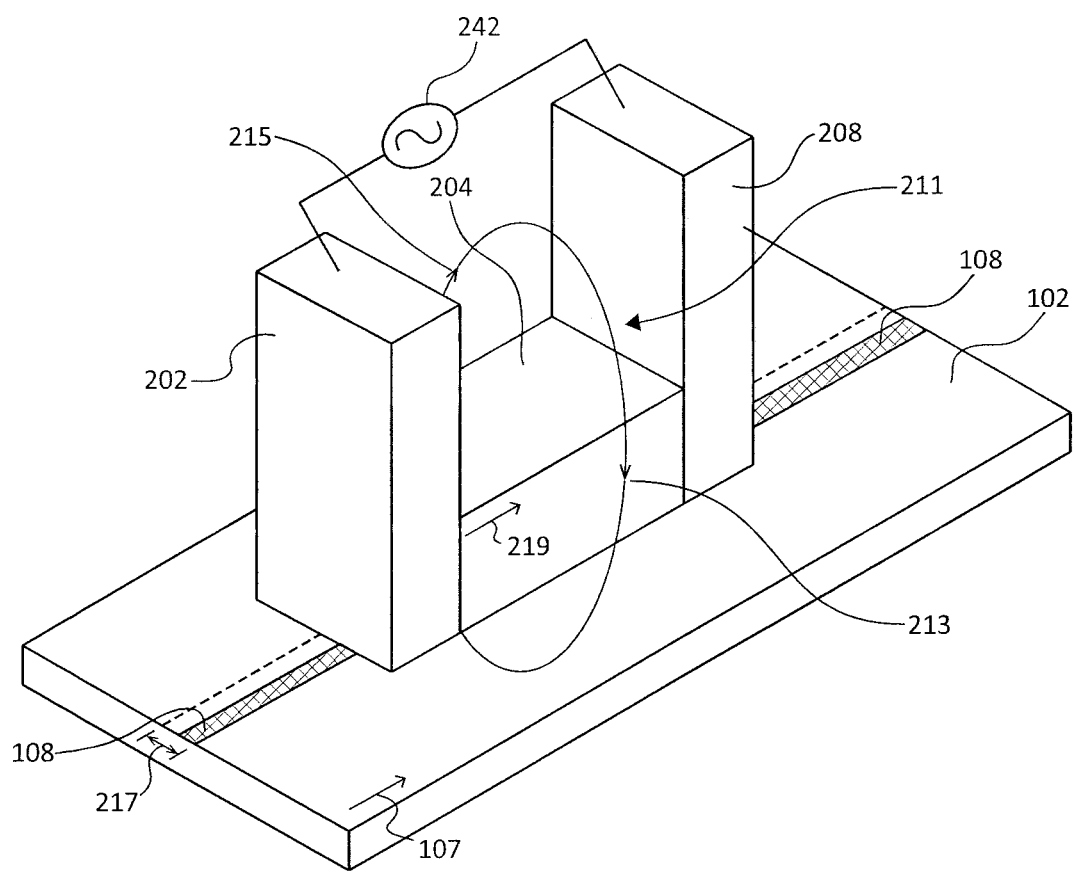
FIG. 2E is a perspective view of a portion of the writer of FIG. 2A showing an alternating current supplied to the writer of FIG. 2A.

FIG. 2E shows a portion of writer 200 of FIG. 2A connected to an alternating current power supply that provides the time varying current to the writing assistance wire 200. As can be seen in FIG. 2E, writer 200 is positioned over track 108 of data storage medium 102 with writing-assisting wire 204 disposed in a down-track direction. Alternating current power supply 242 is coupled to write pole 202 and to second return pole or trailing edge shield 208. A separate alternating current power supply (not shown) may be coupled to conductive coil 210. Time-varying currents through conductive coil 210 and writing-assistance wire 204 may be controlled in order to maximize the combined write field from write pole 202 and assist magnetic field from wire 204 at magnetic medium 102. More specifically, because writing-assistance wire 204 is positioned between the trailing edge of write pole tip 224 and second return pole or trailing edge shield 208, writing-assistance wire 204 is positionally offset from the bit to be written in magnetic medium 102 when write pole 202 is positioned over the bit to be written. Consequently, current should be provided through writing-assistance wire 204 prior to providing the current through conductive coil 210 to assure that the peak magnetic field from writing-assistance wire 204 is applied to the bit to be written at substantially the same time as the peak magnetic field is generated by write pole 202. This may be accomplished by, for example, phase shifting the current through conductive coil 210 relative to the current through writing-assistance wire 204. A noted above, one reason for narrower tracks is due to a field, which is produced when current is passed through the writing-assistance wire 204, cancelling a portion of a field from the write pole 202. In the embodiment shown in FIG. 2E, field 211 is shown around writing-assistance wire 204 when the current has a direction 219. Portion 213 of field 211 is in a downward direction and therefore adds to the write field, which is also in a downward direction. However, portion 215 of field 211 is in an upward direction and therefore cancels a portion of the downward write filed. Thus, track 108 is narrower than it would have been without the field 211. A broader tack with a combined width 217, for example, would be written without field 211. It should be noted that, since current through writing-assistance wire 204 is alternating, the direction 219 will flip in accordance with the alternating current. However, a flip in current direction 219 will still cancel a same portion of the write field because the write current also flips in a same manner as the current through the writing-assistance wire 204 and changes the polarity of the write pole 202.

Figure 2F:
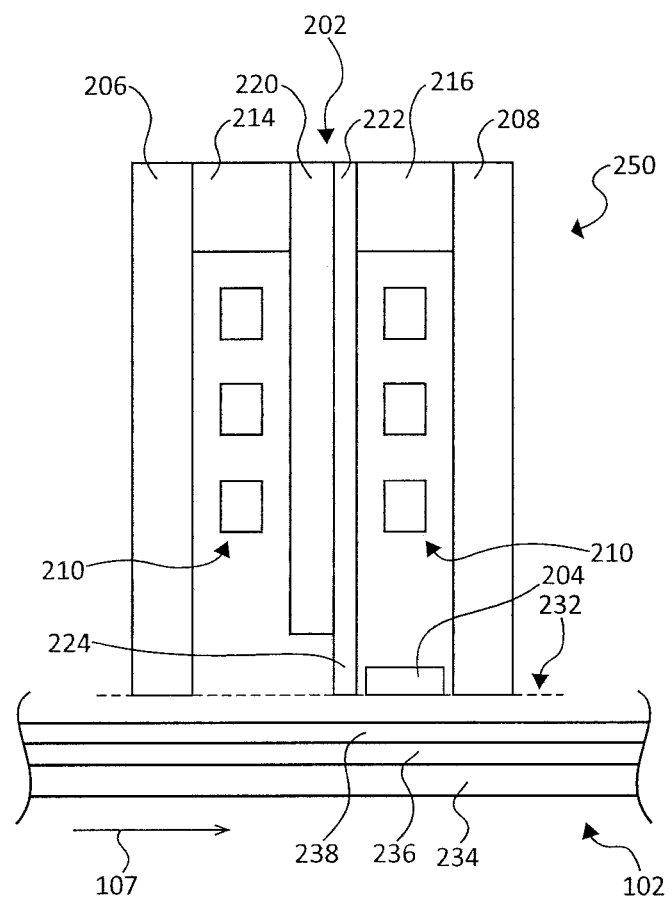
FIG. 2F is a cross-sectional view of a writer including a writing-assistance wire positioned in a down-track direction in accordance with a third embodiment.
Figure 2G:
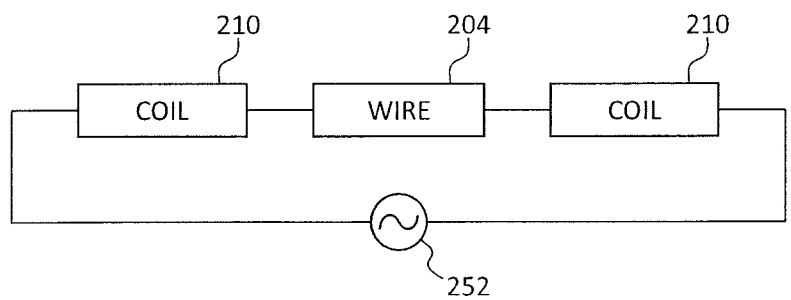
FIG. 2G is a simplified block diagram showing alternating current supplied to a coil and to the writing-assistance wire of FIG. 2F.

FIG. 2F is a cross-sectional view of a writer 250 including a writing-assistance wire positioned in a down-track direction in accordance with another embodiment. Elements of writer 250 are substantially similar to the elements of writer 200 of FIG. 2A. Therefore, in the interest of brevity, the description of the different elements is not repeated in connection with FIG. 2F. A primary difference between writer 250 and writer 200 is that, in writer 250, writing-assistance wire 204 in not in contact with write pole tip 224 and second return pole or trailing edge shield 208. In this embodiment, writing-assistance wire does not receive an alternating current from a power supply coupled to write pole 202 and second return pole or trailing edge shield 208. Instead, as shown in FIG. 2G, both conductive coil 210 and writing-assistance wire 204 are connected to a same alternating current power supply 252. In the embodiment of FIG. 2G, conductive coil 210 and writing-assistance wire 204 are connected in series. In the interest of simplification, components such as optional phase shifting circuitry are not shown n FIG. 2G.

Figure 3:
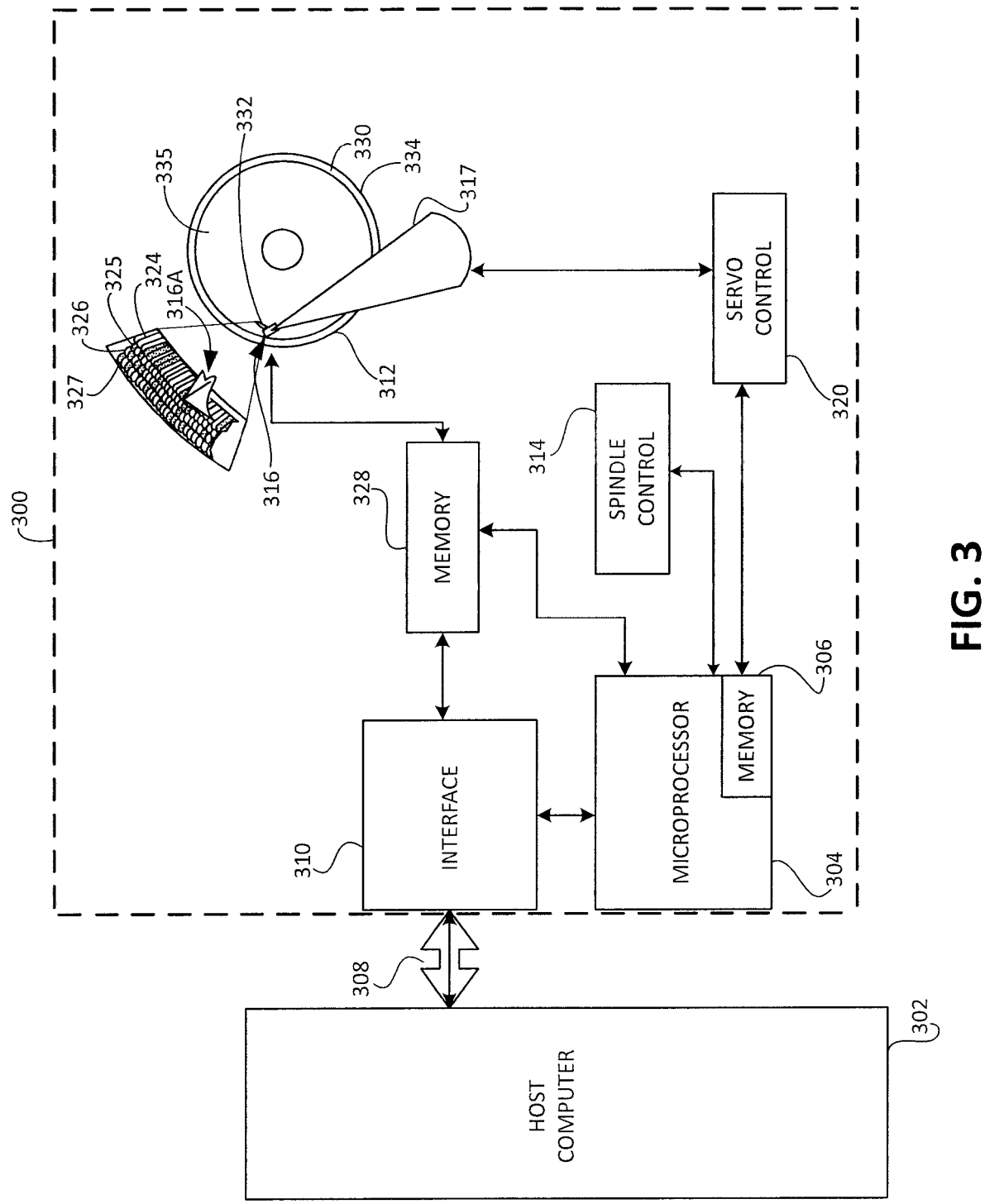
FIG. 3 is a block diagram of a data storage device in which tracks are written in a shingled format in accordance with one embodiment.

FIG. 3 shows a block diagram of a disc drive 300 that includes a writer such as 200 (of FIG. 2A) or 250 (of FIG. 2B). An alternating current supplied to the writing-assistance wire in accordance with one embodiment. As will be described in detail further below, in one embodiment disc drive 300 employs one or more discs on which multiple data tracks may be written in a partially-overlapping shingled pattern, with each successive track overwriting a portion of the previous track. The writing of relatively narrow tracks when the alternating current is supplied to the writing-assistance wire is well-suited for writing tracks in partially-overlapping shingled pattern to provide a TPI advantage.

Disc drive 300 is shown in FIG. 3 to be operably connected to a host computer 302 in which disc drive 300 may be mounted. Disc drive 300 includes a microprocessor 304 that generally provides top level communication and control for disc drive 300 in conjunction with programming for microprocessor 304 stored in microprocessor memory 306. Disc drive 300 may communicate with host computer 302 using a bus 308.

Memory 306 can include random access memory (RAM), read only memory (ROM), and other sources of resident memory for microprocessor 304. Disc drive 300 includes one or more data storage discs 312. Discs 312 are rotated at a substantially constant high speed by a spindle control circuit 314. One or more recording heads 316 including writers such as 200 or 250 (not separately shown in FIG. 3) communicate with the surface(s) of discs 312 to carry out data read/write operations. The radial position of heads 316 is controlled through the application of current to a coil in an actuator assembly 317. A servo control system 320 provides such control.

As noted above, in some embodiments, tracks may be written on one or more storage discs 312 in a partially-overlaying relationship. The overlaying of tracks is shown in close-up view of area 322 of disc(s) 312. In area 322, a corner of head 316A (including, for example, a writer such as 200 (of FIG. 2A) or 250 (of FIG. 2E)) is shown writing a track portion 324. Different shading within the track portion 324 represents different magnetic orientations that correspond to different values of stored binary data. The track portion 324 is overlaid over part of track portion 325. Similarly, track portion 325 is overlaid over part of portion 326, portion 326 is overlaid over portion 327, etc.

The portions 324-327 may be part of what is referred to herein as a physical band which, in this embodiment, may include tens, hundreds or thousands of similarly overlapping, concentric portions 324-327. Gaps are created between such physical bands so that each physical band can be updated independently of other physical bands. The overlaying of successive track portions within a physical band in shingled magnetic recording means that individual parts of the physical band may not be randomly updated on their own. This is because spacings between centers of track portions 324, 325, 326, 327, for example, are smaller than a width of a write pole (not separately show) of head 316. However, a width of a reader (not separately shown) of head 316 may be small enough to read individual track portions 324, 325, 326, 327, thereby enabling random reads of data to be carried out.

In certain embodiments, disc drive 300 includes a memory 328 that may serve as, for example, a first/upper level cache. In some embodiments, memory 328 is physically separate from discs 312. The memory 328 may be of a different type than the discs 312.

In some embodiments, the one or more storage discs 312 are managed as non-overlapping disc portion 330 and disc portion 335. In some embodiments, disc portion 330 is used for a second level cache (e.g., a portion of the disc(s) 312 may be reserved for use as second level cache). In some embodiments, disc portion 330 may comprise shingled bands. In other embodiments, disc portion 330 may be non-shingled (e.g., element 330 may include tracks that are each of a sufficiently large width relative to the width of the write pole of head 316 to allow the write pole to write data to individual ones of the tracks without overwriting data in any adjacent tracks).

Disc drive 300 may use memory 328 in conjunction with disc portion 330 in order to manage data as the data is being transferred to main storage locations 335 on disc(s) 312. As noted above, the data storage operations are carried out with the help of a writer such as 200 (of FIG. 2A) or 250 (of FIG. 2E) with an alternating current supplied to the writing-assistance wire. In the interest of simplification, components such as a read/write channel which encodes data and provides requisite write current signals to heads 316 is not shown in FIG. 3.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A recording head for writing data on tracks of a data storage medium, the recording head comprising:
    a writer having a write pole and a trailing shield, the write pole comprising a pole tip configured to write on the tracks of the data storage medium; and
    a writing-assistance wire positioned between the pole tip and the trailing shield in a down-track direction to enable a writing-assistance current to be provided in the down-track direction to produce an assist magnetic field that augments a write field produced by the write pole.

2. The recording head of claim 1 and wherein the writing-assistance wire is in contact with both the pole tip and the trailing shield.

3. The recording head of claim 2 and wherein the writing-assistance current comprises an alternating current provided to the writing-assistance wire by an alternating current power supply that is coupled to the write pole and the trailing shield.

4. The recording head of claim 1 and further comprising a conductive coil proximate to the write pole.

5. The recording head of claim 4 and wherein the conductive coil is coupled to the writing-assistance wire.

6. The recording head of claim 5 and wherein the writing-assistance current comprises an alternating current provided to the writing-assistance wire by an alternating current power supply that is coupled to the conductive coil.

7. A data storage device comprising the recording head of claim 1 and further comprising the data storage medium with the tracks, and wherein the tracks are written to, by the recording head, in a shingled format.

8. A data storage device comprising the recording head of claim 1 and further comprising the data storage medium with the tracks, and wherein the tracks are written to, by the writer, in a non-shingled format.

9. A method of making a recording head for writing data on tracks of a data storage medium, the method comprising:
providing a writer having a write pole and a trailing shield, the write pole comprising a pole tip configured to write on the tracks of the data storage medium; and
providing a writing-assistance wire between the pole tip and the trailing shield in a down-track direction to enable a writing-assistance current to be provided in the down-track direction to produce an assist magnetic field that augments a write field produced by the write pole.

10. The method claim 9 and further comprising connecting the writing-assistance wire to the pole tip and to the trailing shield.

11. The method of claim 10 and wherein the writing-assistance current comprises an alternating current provided to the writing-assistance wire by an alternating current power supply that is coupled to the write pole and the trialing shield.

12. The method of claim 9 and further comprising including a conductive coil proximate to the write pole.

13. The method of claim 12 and further comprising coupling the conductive coil to the writing-assistance wire.

14. The method of claim 13 and wherein the writing-assistance current comprises an alternating current provided to the writing-assistance wire by an alternating current power supply that is coupled to the conductive coil.

15. A data storage device comprising:
a data storage medium having tracks;
a recording head comprising:
a writer having a write pole and a trailing shield, the write pole comprising a pole tip configured to write on the tracks of the data storage medium; and
a writing-assistance wire positioned between the pole tip and the trailing shield in a down-track direction to enable a writing-assistance current to be provided in the down-track direction produce an assist magnetic field that augments a write field produced by the write pole.

16. The data storage device of claim 15 and wherein the writing-assistance wire is in contact with both the pole tip and the trailing shield.

17. The data storage device of claim 16 and wherein the writing-assistance current comprises an alternating current provided to the writing-assistance wire by an alternating current power supply that is coupled to the write pole and the trialing shield.

18. The data storage device of claim 15 and further comprising a conductive coil proximate to the write pole.

19. The data storage device of claim 18 and wherein the conductive coil is coupled to the writing-assistance wire.

20. The data storage device of claim 19 and wherein the writing-assistance current comprises an alternating current provided to the writing-assistance wire by an alternating current power supply that is coupled to the conductive coil.

* * * * *